April 8, 1952 G. OULIANOFF 2,592,060
MOUNTING OF COMBUSTION CHAMBERS IN JET-PROPULSION
AND GAS-TURBINE POWER-UNITS
Filed March 3, 1947 4 Sheets-Sheet 1
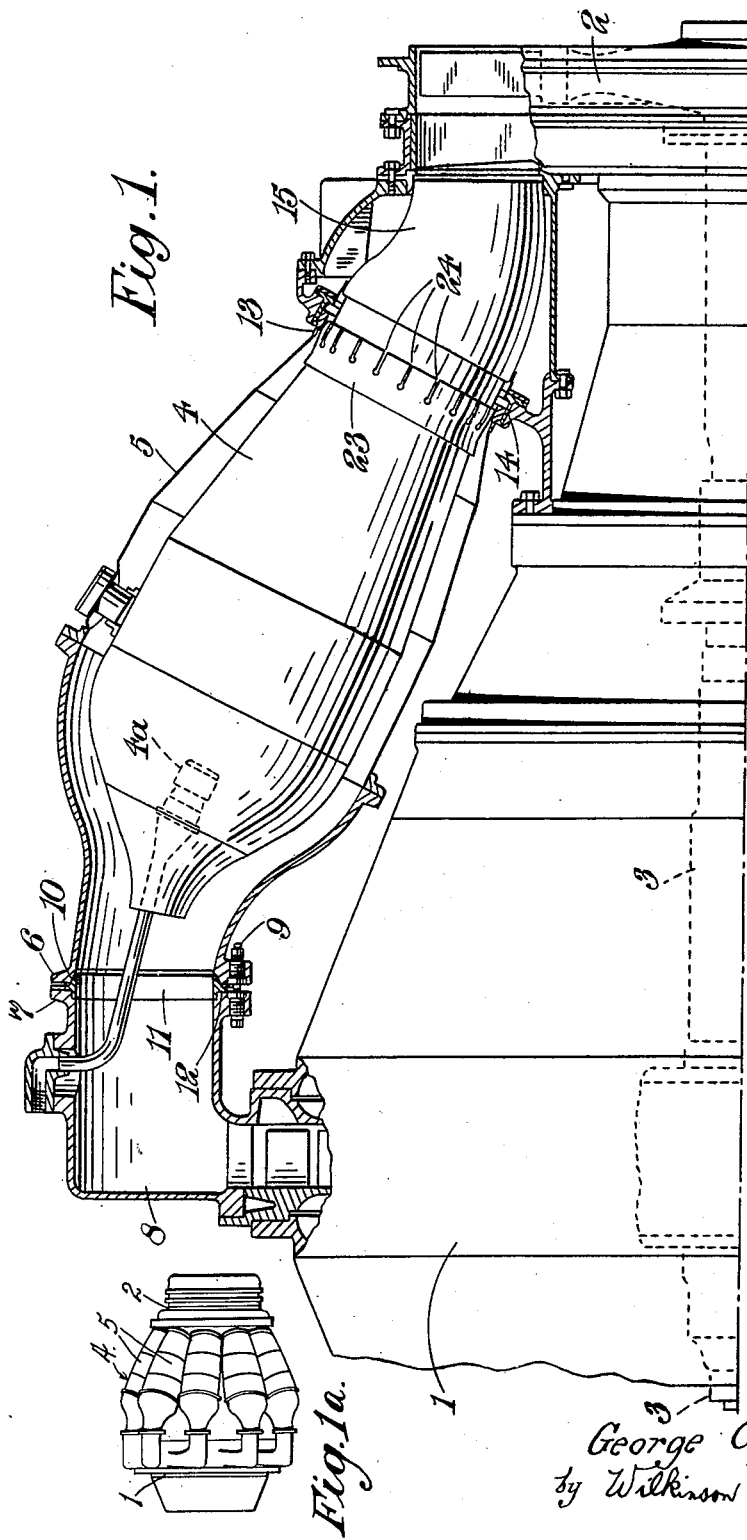
Inventor
George Oulianoff
by Wilkinson & Mawhinney
Attorneys

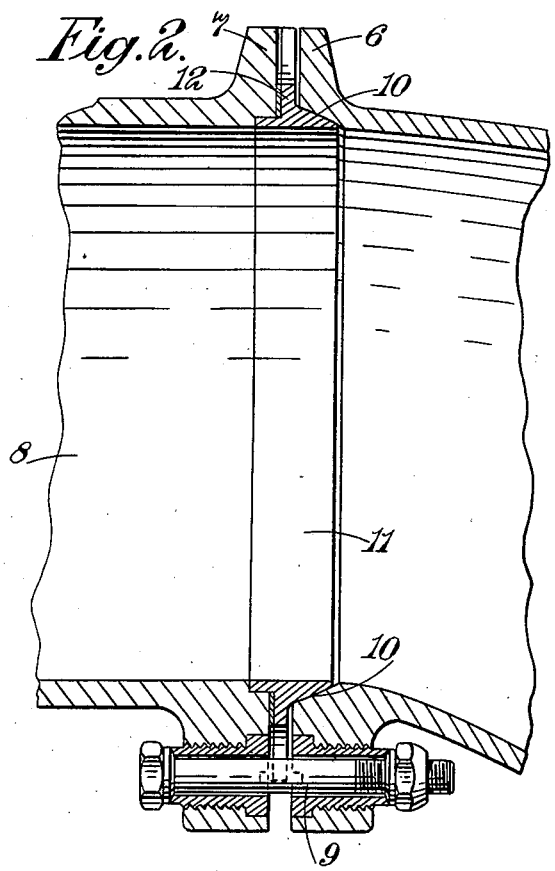
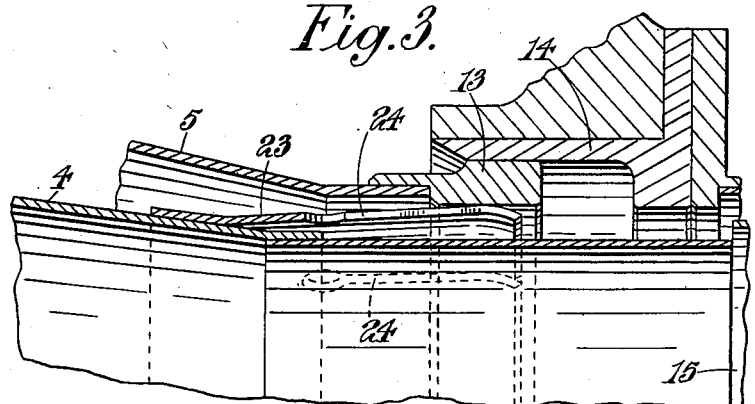

INVENTOR
GEORGE OULIANOFF
by Wilkinson Mawhinney
Attys.

UNITED STATES PATENT OFFICE 2,592,060

MOUNTING OF COMBUSTION CHAMBERS IN JET-PROPULSION AND GAS-TURBINE POWER-UNITS

George Oulianoff, Rimington, near Clitheroe, England, assignor to Rolls-Royce Limited, Derby, England, a British company Application March 3, 1947, Serial No. 732,074
In Great Britain March 25, 1946

16 Claims. (Cl. 60—39.32)

This invention relates to jet-propulsion and gas-turbine power-units in which each of a number of combustion-chambers, usually more than one, is supported at each of its two ends by a joint connecting it to a member of the power-unit.

The invention comprises an improved arrangement for mounting the combustion-chambers in such engines so that a limited range of angular disposition in any direction of the combustion-chamber is available in the assembly of the power-unit.

According to the invention, the joint at one end of the combustion chamber is constructed to locate the combustion-chamber axially and to allow a limited range of universal angular setting of the combustion-chamber relatively to the member of the power-unit to which it is connected at that end, and the joint at the other end is constructed to allow a limited range of universal angular setting of the combustion chamber and of axial movement of the combustion chamber both relative to the member of the power-unit to which it is connected at that end.

In one form of the invention, the joint is formed between two faces one or each of which forms a spherical seat for the other.

In another form of the invention, a yielding packing ring is interposed between the two parts of the joint so that a limited angular adjustment of one part of the joint relatively to the other in any direction is permitted by the yielding of the packing ring. When such a yielding packing ring is used, one of the parts of the joint between which the packing is located may be clamped against the other by means of a ring nut having a curved surface of rotation, for example, a spherical surface, adapted to engage a curved surface of rotation on the first-mentioned joint part arranged so as to allow universal angular movement of the jointed part relatively to the ring nut.

Figure 4:
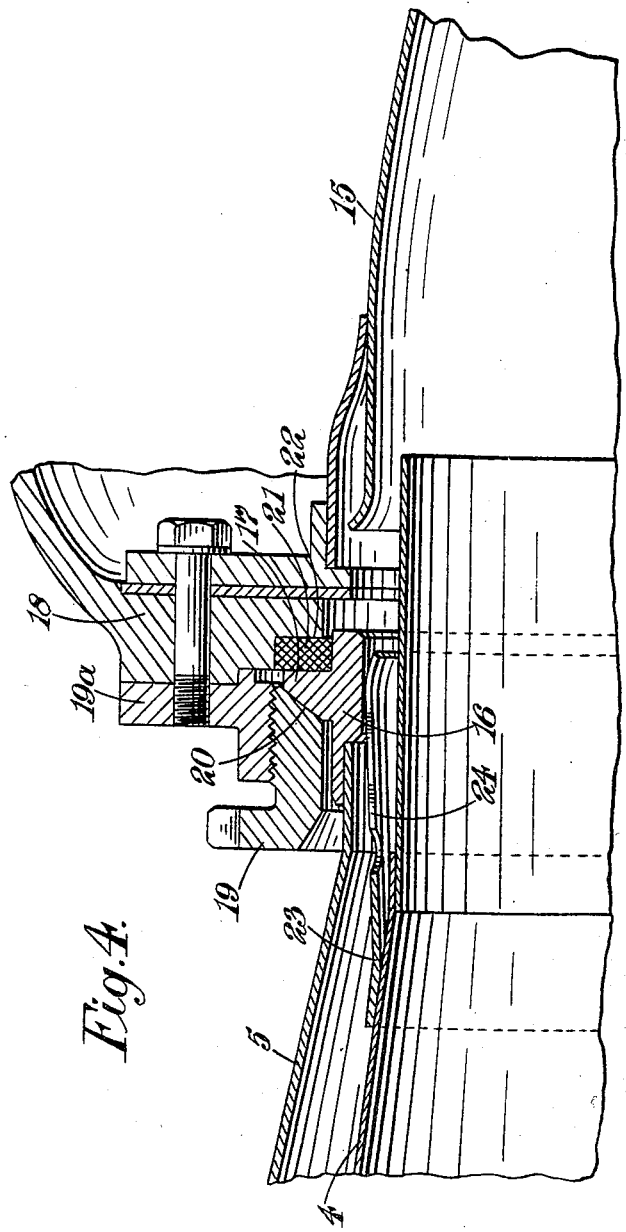
Figure 5:
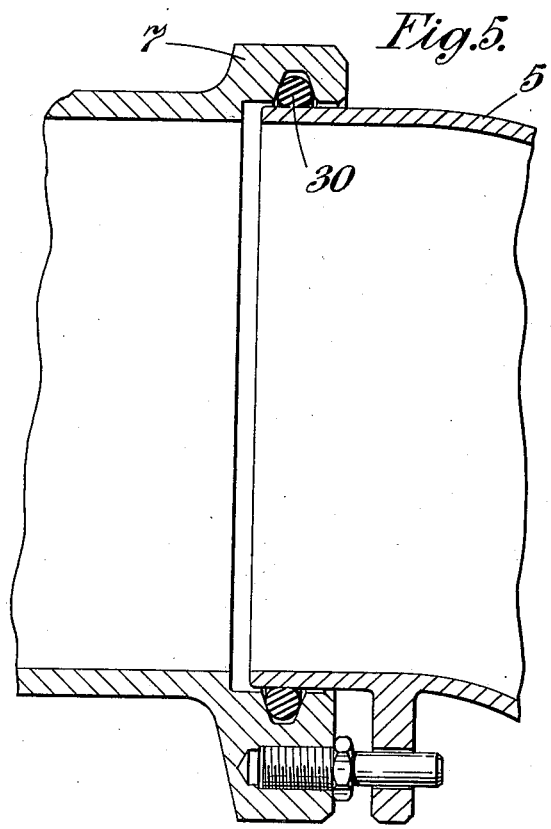
Figure 6:
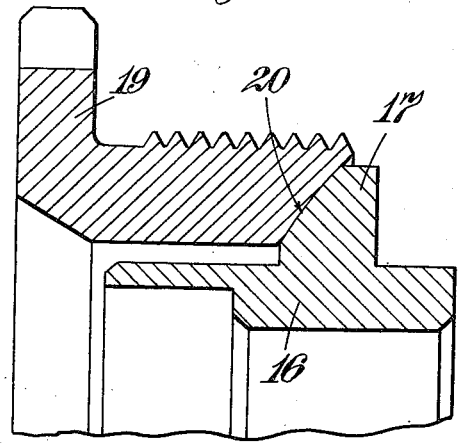
Figure 7:
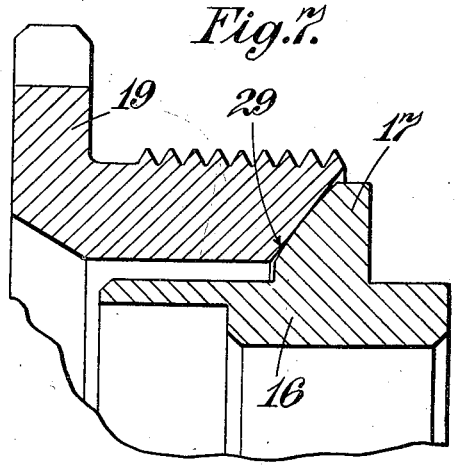

The invention will now be described in more detail with reference to the accompanying drawings which illustrate two examples of arrangements according to the invention and in which:

Figure 1 is a diagrammatic sectional view of one form of power-unit to which the invention is applicable, Figure 1a is an external view of the same power-unit, Figure 2 is a fragmentary sectional view drawn to a larger scale showing one form of joint according to the invention for attaching the forward end of a combustion-chamber to an outlet-conduit from a compressor of the power-unit so as to allow universal angular setting of the combustion-chamber, Figure 3 is a fragmentary sectional view also drawn to a larger scale than Figure 1 showing a form of joint for connecting the rearward end of the combustion-chamber to the nozzle-box of the gas-turbine of the power unit, Figure 4 is a fragmentary sectional view drawn to a larger scale than Figure 1 showing an alternative form of joint according to the invention permitting universal angular movement of the combustion-chamber, Figure 5 is a fragmentary sectional view also drawn to a larger scale than Figure 1 showing a form of joint for connecting the forward end of a combustion chamber to an outlet-conduit from a compressor of the power-unit, and Figures 6 and 7 are enlargements, not to scale of parts of the joint shown in Figure 4.

Figures 1 and 1a show a typical power-unit to which this invention is applicable which comprises a compressor 1 at the front end of the unit, a gas-turbine 2 at the rear end of the unit to which the compressor 1 is coupled by a shaft 3 and a number of combustion-chambers 4 with burners or fuel injectors 4A arranged in a ring round the shaft 3 between the compressor 1 and the turbine 2, each combustion-chamber being attached at its forward end to an outlet-conduit through which it receives compressed air from the compressor and at its rearward end to a nozzle-box 15 of the gas-turbine to which it delivers combustion-products for driving the turbine. Each combustion-chamber comprises an outer casing 5 within which the various parts of the combustion-chamber, such as a flame-tube and a burner, are supported, and the forward end of outer casing 5 constitutes an expansion-chamber.

Figure 2 of the drawings shows one form of joint according to the invention for attaching the front end of a combustion-chamber to an outlet conduit of the compressor so as to locate the combustion-chamber axially and to allow a limited range of universal angular setting of the combustion-chamber relatively to the outlet-conduit from the compressor.

In this form of construction, the forward end of the outer casing 5 of the combustion-chamber is provided with a flange 6 for attachment to a flange 7 on an outlet-conduit 8 from the compressor as by bolts 9 passing through both flanges. The inner surface of the opening at the front end of the casing 5 within the flange 6 is recessed so as to form a spherical joint-face 10, and the inner surface of the open end of the conduit 8 within its flange 7 is stepped to receive a ring 11 having one side-face correspondingly stepped to engage the conduit 8 and the other side formed with a spherical joint-face to engage the joint-face 10. The inner surface of the ring 11 is of the same diameter as the internal diameters of the conduit 8 and casing 5 where they meet at the joint, and forms part of the duct conveying air from the former to the latter. The ring 11 is formed with circumferential flange 12 which lies between the flanges 6 and 7.

When assembling the combustion-chamber in the power-unit, the axially-extending left-hand end portion of the ring 11 is introduced to fit into the conduit 8 and to be supported thereby. Thereafter the combustion-chamber is brought into engagement with the ring so that the spherical joint-face of the ring is seated on the joint-face 10. The bolts 9 are then passed through the attachment flanges; and tightening thereof clamps the joint in the angular setting of the combustion chamber in assembly. This angular disposition accommodates any slight malalignment in the assembly.

Figure 3 of the drawings shows a suitable form of joint for attaching the rear end of the combustion-chamber to the nozzle-box of the gas turbine when the joint at the front end of the combustion-chamber is constructed as described with reference to Figure 2. It comprises a sealing ring 13 fixed to the outer casing 5 of the combustion-chamber and slidably engaged in a cylindrical seating 14 secured to the nozzle-box casing of the gas-turbine. The inner casing or flame-tube of the combustion-chamber 4 has secured on it a ring 23 slotted at 24 from its end to provide a yielding support for the casing 4 in the ring 13. It will be readily appreciated that this joint supports the rear end of the combustion-chamber against movement in any direction transverse to its axis but allows a limited degree of axial movement of the rear end of the combustion-chamber relatively to the nozzle-box and allows slight mis-alignment of the combustion-chamber relatively to the nozzle-box.

Figure 4 illustrates another form of joint according to the invention adapted for attaching the rear end of the combustion-chamber to the nozzle-box. In this construction there is secured on the rear end of the outer casing 5 of the combustion-chamber a ring-member 16 formed with a radially extending flange 17 which is of rounded shape on one side and flat on the other side. This ring-member has an inner cylindrical surface supporting the flame-tube 4 of the combustion-chamber which is adapted to project into the nozzle-box of the gas-turbine through an opening in a part of the nozzle-box casing 18. The ring-member 16 is secured to the nozzle-box-casing by means of a ring-nut 19 which is screwed into the threaded ring 19A attached to 18 by studs and is formed with a conical surface 29 (Figure 7) or spherical surface 20 (Figure 6) to engage the rounded portion of the flange of the ring 16; the flat side of this flange engages a packing-ring 21 of yielding material such, for example, as a steel-and-asbestos washer, between it and a cooperating flat face 22 on the casing 18. With this construction, the ring-member 16 is capable of variation of angular disposition by pressing the packing-ring 21 more at one side diametrically than the other, without impairing the strength and rigidity of the joint when it is screwed up. Since the ring 16 is secured to the casing 5 of the combustion-chamber, this latter is also capable of the small variation of angular disposition.

When the rear end of the combustion-chamber is attached to the nozzle-box of the gas-turbine by a joint constructed as described with reference to Figure 4 of the drawings, the forward end of the casing 5 may be engaged with the compressor outlet as shown in Figure 5 by a sliding graphited-asbestos joint 30 which permits axial expansion or adjustment of the combustion-chamber and also slight misalignment.

It will be seen that by supporting the combustion-chamber at one end by means of a joint which permits axial sliding movement and also some slight misalignment of the combustion-chamber, and at the other end by means of a joint which allows slight universal variations in the angular setting of the combustion-chamber whilst locating that end against axial displacement, the invention provides a construction which allows slight misalignment of the combustion-chamber in relation to the other parts of the power-unit whilst still providing for firm support and positive location in an axial direction.

I claim:

1. In a power plant, a turbine, a compressor connected to be driven by said turbine, a combustion chamber having an inlet and an outlet and, a first mounting-member providing at least part of a duct-connection between said compressor and said inlet end of said combustion chamber, a first fluid-tight joint between said first mounting-member and said combustion-chamber at said inlet end thereof, a second mounting-member providing at least part of a duct-connection between said outlet end of said combustion chamber and said turbine, and a second fluid-tight joint between said combustion chamber at said outlet end thereof and said second mounting member, one of said fluid-tight joints comprising an external flange on said combustion chamber at one end thereof, said flange having a flat disc face and an opposed spherical face, said flat disc face being adjacent the mounting member associated with it, a yieldable packing ring interposed between said flat disc face and said associated mounting member, a ring-nut, a thread on said associated mounting member located to receive said ring-nut coaxially with said external flange, and an inwardly directed flange on said ring-nut having a surface to abut in sealing relation with said spherical face.

2. A combination according to claim 1 wherein said surface of said inwardly directed flange is spherical.

3. A combination according to claim 1 wherein said surface of said inwardly directed flange is conical.

4. In a gas turbine power plant, a turbine, a compressor connected to be driven by said turbine, turbine inlet structure, compressor delivery structure, a combustion chamber, a universally-angularly-settable joint whereby one end of said combustion chamber is connected to one of said structures, locating means to locate the combustion chamber against movement axially of itself with respect to said one of said structures, gas-sealing universally-angularly-settable slide means on the other end of said combustion chamber, and gas sealing slide means on the other of said structures to cooperate with the gas-sealing slide means on said other end of said combustion chamber.

5. In a gas turbine power plant, a turbine, a compressor connected to be driven by said turbine, turbine inlet structure, compressor delivery structure, a combustion chamber, a part on one end of said combustion chamber having a part-spherical gas-sealing surface, a second part on the other end of said combustion chamber having a gas-sealing surface, a third part on one of said structures having a part-spherical gas-sealing surface, locating means to locate the combustion chamber against movement axially of itself with respect to said one of said structures and to draw said part-spherical parts on the combustion chamber and said one structure into engagement, and a fourth part on the other of said structures having a gas-sealing surface slidably engaging the second said surface.

6. In a gas turbine power plant, a turbine, a compressor connected to be driven by said turbine, turbine inlet structure, compressor delivery structure, a combustion chamber having a spherical surface adjacent one end, a sealing surface on one of said structures to seal with said spherical surface, means to maintain said spherical surface and said sealing surface in sealing relation, a part on the other end of said combustion chamber having a gas-sealing surface and a second part on the other of said structures having a gas-sealing surface slidably engaging said first gas-sealing surface.

7. An arrangement according to claim 6 wherein said sealing surface is a spherical surface.

8. An arrangement according to claim 6 wherein said sealing surface is a conical surface.

9. In a gas turbine power plant, a turbine, a compressor connected to be driven by said turbine, turbine inlet structure, compressor delivery structure, a combustion chamber, first abutment means on one of said structures, second abutment means on said combustion chamber, a yielding packing ring between said two abutment means, locating means to locate the combustion chamber against movement axially of itself with respect to said one of said structures, means connecting the other end of the combustion chamber to the other of said structures for axial sliding and slight misalignment relative to the other of said structures and gas sealing means carried by said last means.

10. In a gas turbine power plant, a turbine, a compressor connected to be driven by said turbine, turbine inlet structure, compressor delivery structure, a combustion chamber, a ring and ring-nut mounted one on said combustion chamber and the other on said one of said structures, said ring being formed on one side with a first abutment surface and on the other side with a first sealing surface and said ring-nut being formed with a second sealing surface to cooperate with said first sealing surface, a second abutment surface formed on the member on which said ring is mounted, a yielding packing ring between said abutment surfaces, a part on the other end of said combustion chamber having a gas-sealing surface, and a second part on the other of said structures having a gas sealing surface slidably and universally engaging the first said gas-sealing surface.

11. An arrangement according to claim 10 wherein said first and second sealing surfaces are both spherical.

12. An arrangement according to claim 10 wherein said first sealing surface is a spherical surface and said second sealing surface is a conical surface.

13. In a gas turbine power plant, a turbine, a compressor connected to be driven by said turbine, turbine inlet structure, compressor delivery structure, a combustion chamber having an outer casing, a ring spigotted to said compressor delivery structure providing at least part of a duct-connection between the compressor and the combustion chamber and having on its side remote from the compressor delivery structure an external part-spherical joint-face, an internal joint-face on the outer casing to engage said external joint-face, a flange on said compressor delivery structure, a flange on said outer casing, securing means engaging said flanges, whereby said joint-faces are maintained in contact, a seating secured to said turbine inlet structure, and a ring on said outer casing which ring slidably engages in said seating.

14. In a gas turbine power plant, a turbine, a compressor connected to be driven by said turbine, turbine inlet structure, compressor delivery structure, a combustion chamber having an outer casing, a first joint-face portion on one end of said outer casing, a second joint-face portion on one of said structures to co-operate in gas-sealing contact with said first joint-face portion, one at least of said joint-faces being part-spherical, a first annular portion at the other end of said outer casing, a second annular portion on the other of said structures loosely engaging with said first annular portion to form a slidable joint and resilient gas sealing means between said last mentioned portions.

15. An arrangement according to claim 14 wherein one of said annular portions has a part-spherical surface.

16. An arrangement according to claim 14 wherein both of said annular portions have a part-spherical surface.

GEORGE OULIANOFF.

REFERENCES CITED

The following references are of record in the file of this patent:

UNITED STATES PATENTS

| Number | Name | Date |
| --- | --- | --- |
| 935,412 | Rust | Sept. 28, 1909 |
| 969,423 | Tanner et al. | Sept. 6, 1910 |
| 1,434,631 | Reynolds | Nov. 7, 1922 |
| 2,089,802 | Kirby | Aug. 10, 1937 |
| 2,195,025 | Couzinet | Mar. 26, 1940 |
| 2,345,540 | Ray | Mar. 29, 1944 |
| 2,390,959 | Pfenninger | Dec. 11, 1945 |
| 2,420,135 | Hennig | May 6, 1947 |
| 2,432,359 | Streid | Dec. 9, 1947 |
| 2,435,836 | Johnson | Feb. 10, 1948 |
| 2,479,573 | Howard | Aug. 23, 1949 |